(12) United States Patent
Shepherd et al.

(10) Patent No.: US 12,215,180 B2
(45) Date of Patent: Feb. 4, 2025

(54) MIXTURE CURABLE TO PROVIDE A MATERIAL FOR THERMALLY INSULATING A SUBSTRATE USEABLE SUBSEA

(71) Applicant: Advanced Innergy Ltd., Gloucester (GB)

(72) Inventors: Simon Harry Shepherd, Gloucester (GB); Laura Louise Jordan, Gloucester (GB); Simon Jones, Gloucester (GB); Kamil Tomaszewski, Gloucester (GB)

(73) Assignee: ADVANCED INNERGY LTD., Gloucester (GB)

( * ) Notice: Subject to any disclaimer, the term of this patent is extended or adjusted under 35 U.S.C. 154(b) by 682 days.

(21) Appl. No.: 17/424,600

(22) PCT Filed: Jan. 24, 2020

(86) PCT No.: PCT/GB2020/050171
§ 371 (c)(1),
(2) Date: Jul. 21, 2021

(87) PCT Pub. No.: WO2020/152480
PCT Pub. Date: Jul. 30, 2020

(65) Prior Publication Data
US 2022/0089803 A1 Mar. 24, 2022

(30) Foreign Application Priority Data
Jan. 25, 2019 (GB) ..................... 1901021

(51) Int. Cl.
*C08F 257/02* (2006.01)
*C08F 255/02* (2006.01)

(52) U.S. Cl.
CPC .......... *C08F 257/02* (2013.01); *C08F 255/02* (2013.01)

(58) Field of Classification Search
CPC ................ C08G 61/08; C08G 2261/3324
See application file for complete search history.

(56) References Cited

U.S. PATENT DOCUMENTS

| | | | |
|---|---|---|---|
| 5,480,940 A | 1/1996 | Khasat et al. | |
| 2007/0149656 A1 | 6/2007 | Rayner | |
| 2016/0244632 A1* | 8/2016 | Cruce | B05D 7/222 |
| 2018/0022863 A1* | 1/2018 | Allen | C08G 61/08 |
| | | | 524/739 |
| 2018/0037677 A1 | 2/2018 | Cruce et al. | |

FOREIGN PATENT DOCUMENTS

| | | |
|---|---|---|
| CN | 108058405 A | 5/2018 |
| CN | 108690331 A | 10/2018 |
| EP | 3199577 A1 | 8/2017 |
| JP | H03106961 A | 5/1991 |
| JP | H11322905 A | 11/1999 |
| JP | 2001342328 A | 12/2001 |
| JP | 2005025219 A | 1/2005 |
| JP | 2009079088 A | 4/2009 |
| JP | 2011052076 A | 3/2011 |
| WO | 2013178992 A1 | 12/2013 |
| WO | WO 2013/178992 * | 12/2013 |
| WO | 2014144634 A1 | 9/2014 |
| WO | 2015029877 A1 | 3/2015 |
| WO | 2020152480 A1 | 7/2020 |

OTHER PUBLICATIONS

"International Search Report and Written Opinion of the International Searching Authority for PCT Patent Application No. PCT/GB2020/050171", Mailed Date: Apr. 15, 2020, 16 Pages.
"Search Report for UK Patent Application No. GB1901021.4", Mailed Date: Jan. 17, 2020, 5 Pages.
Office Action for European Patent Application No. 20702895.2, Mailed Date: Dec. 9, 2024, 9 pages.

* cited by examiner

*Primary Examiner* — Robert C Boyle
(74) *Attorney, Agent, or Firm* — CALFEE, HALTER & GRISWOLD LLP

(57) ABSTRACT

A mixture curable in the presence of a metallic catalyst to provide a material for thermally insulating a substrate useable subsea. The mixture comprises from 55 to 99% by weight of a norbornene monomer and a water insoluble polymer filler. The water insoluble polymer filler comprises polystyrene or polypropylene, or derivatives thereof.

13 Claims, No Drawings

MIXTURE CURABLE TO PROVIDE A MATERIAL FOR THERMALLY INSULATING A SUBSTRATE USEABLE SUBSEA

TECHNOLOGICAL FIELD

Examples of the disclosure relate to a mixture curable in the presence of a metallic catalyst to provide a material for thermally insulating a substrate useable subsea, a method of providing the thermally insulating material, a material for thermally insulating a substrate useable subsea, a thermally insulated substrate useable subsea, and a method of providing the thermally insulated substrate.

BACKGROUND

The application of thermal insulation to substrates useable subsea, for example, oil and gas equipment is essential both for the technical feasibility and for the economic viability of a project, particularly in deep water and ultra deep water developments.

Items of subsea equipment which benefit from thermal insulation include, but are not limited to, wellheads and Xmas trees, spool pieces, manifolds, risers, pipe field joints, and jumpers. Clearly any insulation material or system must be capable of being easily formed into complex shapes to accommodate the components of a pipe line assembly.

There is a requirement to provide thermally insulating materials which have improved properties.

All proportions referred to in this specification are indicated as % by weight of the total composition.

BRIEF SUMMARY

According to various, but not necessarily all, examples of the disclosure there is provided a mixture curable in the presence of a metallic catalyst to provide a material for thermally insulating a substrate useable subsea, wherein the mixture comprises from 55 to 99% by weight of a norbornene monomer and a water insoluble polymer filler, wherein the water insoluble polymer filler comprises polystyrene or polypropylene, or derivatives thereof.

The metallic catalyst may be a ruthenium-based catalyst. The ruthenium-based catalyst may be a Grubbs catalyst.

The mixture may comprise a mixture of different norbornene monomers.

The water insoluble polymer filler may be micronized. The water insoluble polymer filler may be a particulate filler. The water insoluble polymer filler may comprise polystyrene, or derivatives thereof. The water insoluble polymer filler may comprise polystyrene. The water insoluble polymer filler may comprise micronized polystyrene. The water insoluble polymer filler may comprise polypropylene, or derivatives thereof. The water insoluble polymer filler may comprise polypropylene. The water insoluble polymer filler may comprise micronized polypropylene.

The mixture may comprise from 60 to 99% by weight of the norbornene monomer, and may comprise from 65 to 99% by weight of the norbornene monomer, and may comprise from 70 to 99% by weight of the norbornene monomer, and may comprise from 75 to 99% by weight of the norbornene monomer, and may comprise from 80 to 99% by weight of the norbornene monomer, and may comprise from 90 to 99% by weight of the norbornene monomer. The mixture may comprise from 55 to 95% by weight of the norbornene monomer, and may comprise from 55 to 97% by weight of the norbornene monomer, and may comprise from 55 to 98% by weight of the norbornene monomer, and may comprise from 60 to 98% by weight of the norbornene monomer, and may comprise from 65 to 98% by weight of the norbornene monomer, and may comprise from 70 to 98% by weight of the norbornene monomer, and may comprise from 75 to 98% by weight of the norbornene monomer, and may comprise from 80 to 98% by weight of the norbornene monomer, and may comprise from 85 to 98% by weight of the norbornene monomer, and may comprise from 90 to 98% by weight of the norbornene monomer.

In other examples, the mixture may comprise from 55 to 99% by weight of the norbornene monomer, and may comprise from 55 to 85% by weight of the norbornene monomer, and may comprise from 60 to 70% by weight of the norbornene monomer.

The mixture may comprise from 1 to 50% by weight of the water insoluble polymer filler, and may comprise from 15 to 45% by weight of the water insoluble polymer filler, and may comprise from 20 to 40% by weight of the water insoluble polymer filler, and may comprise from 25 to 30% by weight of the water insoluble polymer filler.

The mixture may comprise from 1 to 45% by weight of the water insoluble polymer filler, and may comprise from 1 to 40% by weight of the water insoluble polymer filler, and may comprise from 1 to 35% by weight of the water insoluble polymer filler, and may comprise from 1 to 30% by weight of the water insoluble polymer filler, and may comprise from 1 to 25% by weight of the water insoluble polymer filler, and may comprise from 1 to 20% by weight of the water insoluble polymer filler, and may comprise from 1 to 15% by weight of the water insoluble polymer filler, and may comprise from 1 to 10% by weight of the water insoluble polymer filler, and may comprise from 1 to 5% by weight of the water insoluble polymer filler.

According to various, but not necessarily all, examples of the disclosure there is provided a material for thermally insulating a substrate useable subsea, wherein the material is the cured reaction product of a mixture comprising from 55 to 99% by weight of a norbornene monomer and a water insoluble polymer filler, wherein the water insoluble polymer filler comprises polystyrene or polypropylene, or derivatives thereof.

According to various, but not necessarily all, examples of the disclosure there is provided a material for thermally insulating a substrate useable subsea, wherein the material comprises a norbornene polymer and a water insoluble polymer filler, wherein the water insoluble polymer filler comprises polystyrene or polypropylene, or derivatives thereof.

According to various, but not necessarily all, examples of the disclosure there is provided a method, wherein the method comprises:

mixing from 55 to 99% by weight of a norbornene monomer and a water insoluble polymer filler, wherein the water insoluble polymer filler comprises polystyrene or polypropylene, or derivatives thereof;

allowing the mixture to cure in the presence of a metallic catalyst to provide a material for thermally insulating a substrate useable subsea.

According to various, but not necessarily all, examples of the disclosure there is provided a thermally insulated substrate useable subsea, wherein the thermally insulated substrate comprises a thermally insulating material, wherein the thermally insulating material is the cured reaction product of a mixture comprising from 55 to 99% by weight of a norbornene monomer and a water insoluble polymer filler, wherein the water insoluble polymer filler comprises polystyrene or polypropylene, or derivatives thereof.

The thermally insulating material may coat the substrate.

Examples of mixtures according to the disclosure (E1 to E7) are provided in table 1 below, along with comparative examples C1 and C2.

TABLE 1

| Component | Specific example of component | E1 (wt %) | E2 (wt %) | E3 (wt %) | E4 (wt %) | E5 (wt %) | E6 (wt %) | E7 (wt %) | C1 (wt %) | C2 (wt %) |
|---|---|---|---|---|---|---|---|---|---|---|
| norbornene-monomer | a mixture of 5-octyl-2-norbornene and tricyclopentadiene | 61.24 | 61.24 | 78.74 | 71.57 | 71.57 | 81.57 | 97.57 | 98.04 | 81.37 |
| Water insoluble polymer filler | polypropylene | 37.53 | None | None | 27.00 | None | None | None | None | None |
| Water insoluble polymer filler | polystyrene | None | 37.53 | 19.69 | None | 27.00 | 17.00 | 1.00 | None | None |
| Filler | Glass microspheres | None | None | None | None | None | None | None | None | 17.00 |
| Metallic catalyst | Grubbs catalyst | 1.23 | 1.23 | 1.57 | 1.43 | 1.43 | 1.43 | 1.43 | 1.96 | 1.63 |

According to various, but not necessarily all, examples of the disclosure there is provided a thermally insulated substrate useable subsea, wherein the thermally insulated substrate comprises a thermally insulating material, wherein the thermally insulating material comprises a norbornene polymer and a water insoluble polymer filler, wherein the water insoluble polymer filler comprises polystyrene or polypropylene, or derivatives thereof.

According to various, but not necessarily all, examples of the disclosure there is provided a method, wherein the method comprises:
  applying a mixture to a substrate useable subsea, wherein the mixture comprises from 55 to 99% by weight of a norbornene monomer and a water insoluble polymer filler, wherein the water insoluble polymer filler comprises polystyrene or polypropylene, or derivatives thereof;
  allowing the mixture to cure in the presence of a metallic catalyst to provide a thermally insulated substrate useable subsea.

The mixture may be injected into a mould surrounding the substrate.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only.

DETAILED DESCRIPTION

As exemplified in table 1, the disclosure provides a mixture curable in the presence of a metallic catalyst to provide a material for thermally insulating a substrate useable subsea. The mixture comprises from 55 to 99% by weight of a norbornene monomer and a water insoluble polymer filler, wherein the water insoluble polymer filler comprises polystyrene or polypropylene, or derivatives thereof.

In the above examples, the respective mixtures comprise two different norbornene monomers, namely: 5-octyl-2-norbornene and tricyclopentadiene. In other examples, the mixture may comprise just a single norbornene monomer, or may comprise mixtures of different norbornene monomers.

A norbornene monomer comprises norbornene, that is, a cyclohexene ring with a methylene bridge between carbon atoms 1 and 4. Norbornene is a bridged cyclic hydrocarbon. In this specification, a norbornene monomer is therefore norbornene, or any derivative thereof, for example, 5-octyl-2-norbornene, tricyclopentadiene, dicyclopentadiene, or 5-ethylidene-2-norbornene.

The subsequently cured material comprises a norbornene polymer (polynorbornene) corresponding to the selected norbornene monomer(s). The norbornene polymer may be a thermoset norbornene polymer (TNP).

The water insoluble polymer filler is inert. In some examples, the water insoluble polymer filler is a plastic, and may be a thermoplastic. The water insoluble polymer filler may be a synthetic polymer.

Examples of the disclosure also provide a method. The method comprises mixing from 55 to 99% by weight of a norbornene monomer and a water insoluble polymer filler, wherein the water insoluble polymer filler comprises polystyrene or polypropylene, or derivatives thereof. The method subsequently comprises allowing the mixture to cure in the presence of a metallic catalyst to provide a material for thermally insulating a substrate useable subsea. The material is therefore the cured reaction product of the mixture and comprises norbornene polymer. The material is a thermally insulating material.

In some examples (for example, E1 and E4), norbornene monomer is mixed with polypropylene in the presence of a Grubbs catalysts. The mixture subsequently cures to provide a material for thermally insulating a substrate useable subsea.

In other examples (for example, E2, E3 and E5 to E7), norbornene monomer is mixed with polystyrene in the presence of a Grubbs catalysts. The mixture subsequently cures to provide a material for thermally insulating a substrate useable subsea.

Mixtures according to examples of the disclosure may comprise less than 2% by weight of the metallic catalyst. The ratio of norbornene monomer to metallic catalyst may be about 50:1.

In some examples, the water insoluble polymer filler may be micronized, for example micronized polypropylene or micronized polystyrene. Without being bound by theory, the increased surface area of a micronized water insoluble polymer filler may result in a subsequently cured material with improved mechanical and thermal properties.

The mixture may be applied to a substrate useable subsea. The mixture may be injected into a mould surrounding the substrate. Accordingly, the mixture subsequently cures in the mould around the substrate. The mould is then removed to provide a thermally insulated substrate useable subsea.

Advantageously, mixing from 55 to 99% by weight of a norbornene monomer, water insoluble polymer filler, wherein the water insoluble polymer filler comprises polystyrene or polypropylene, or derivatives thereof, and metallic catalyst provides a low viscosity flowable mixture which is readily injectable, for example, into a mould. The mixture cures in the mould around the substrate in an exothermic process to provide a cured material comprising a norbornene polymer corresponding to the selected norbornene monomer(s). Without being bound by theory, the water insoluble polymer filler, for example polystyrene, may react with the norbornene monomer.

Accordingly, the thermally insulating material is capable of being easily formed into complex shapes, for example, to accommodate the components of a subsea pipe line assembly.

As indicated in Table 2 below, the cured material according to examples of the disclosure advantageously has a higher tear strength than comparative known materials. Table 2 below provides tear strength data for cured materials resulting from the mixtures indicated in table 1 with respect to examples E1 to E3 and C1.

TABLE 2

|  | E1 | E2 | E3 | C1 |
|---|---|---|---|---|
| Tear Strength (N/mm) | 29.6 | 30.4 | 19.5 | 14.0 |

From table 2 above, it is clear that a comparative example not comprising a filler of any type (C1) has a significantly lower tear strength than examples E1, E2 and E3 of the disclosure. Furthermore, the tear strength increases in examples comprising greater quantities of water insoluble polymer filler, that is, examples E1 and E2.

As indicated in table 3 below, the cured material according to examples of the disclosure advantageously has lower water absorption than comparative known materials. Table 3 below provides water absorption data for cured materials resulting from the mixtures indicated in table 1 with respect to examples E4, E5, C1 and C2.

TABLE 3

|  | Weight | | | Water |
|---|---|---|---|---|
| Example | before g | after g | gain g | absorption % |
| C1 | 448.7 | 449.8 | 1.1 | 0.2 |
| C2 | 394.6 | 473 | 78.4 | 19.9 |
| E4 | 477.8 | 480.3 | 2.5 | 0.5 |
| E5 | 172.8 | 173.7 | 0.9 | 0.5 |

Examples E4 and E5 exhibit a significantly lower level of water absorption compared to comparative example C2, which comprises glass microspheres as a filler instead of a water insoluble polymer filler. Cured materials comprising glass microspheres are traditionally used for subsea insulation materials. Glass microspheres are known to dissolve to an extent in water at temperatures and pressures experienced in subsea applications.

Water absorption by a subsea insulation material has a negative effect on the mechanical and thermal properties of the material, and therefore minimizing water absorption is beneficial.

With regard to E4, the water insoluble polymer filler is polypropylene. With regard to E5, the water insoluble polymer filler is polystyrene.

Examples E4 and E5 have a comparable water absorption compared to C1, which does not comprise a filler. However, cured materials not comprising a filler of any type have a lower tear strength (see table 2 above). Furthermore, cured materials not comprising a filler of any type (for example, C1) have an increased thermo conductivity and a decreased heat capacity relative to materials comprising a filler. According, cured materials not comprising a filler of any type are worse insulators than cured materials comprising a filler. It has also been found that cured materials resulting from the mixtures of examples 1 to 7 are better insulators (have a decreased thermo conductivity and an increased heat capacity) than cured materials resulting from the mixtures of comparative examples comprising glass microspheres (for example, C2).

With regard to example E5, performance after aging for two weeks at 300 bar and 135° C. was determined, and this data is provided in table 4 below.

TABLE 4

| | Dry | | | Aged | | | Joint | | |
|---|---|---|---|---|---|---|---|---|---|
| sample | Tensile Strength MPa | Elongation % | Modulus MPa | Tensile Strength MPa | Elongation % | Modulus MPa | Tensile Strength MPa | Elongation % | Modulus MPa |
| 1 | 3.98 | 45.9 | 11.2 | 4.58 | 61.9 | 9.05 | 4.28 | 96.9 | 4.84 |
| 2 | 4.45 | 53 | 12.3 | 5.24 | 72.1 | 10.8 | 4.48 | 105 | 4.62 |
| 3 | 4.75 | 64 | 9.94 | 4.1 | 54.2 | 10.4 | 4.36 | 98.4 | 4.98 |
| 4 | 4.78 | 67.2 | 10.6 | | | | 5.17 | 113 | 5.47 |
| 5 | 3.88 | 41.2 | 11.9 | | | | 4.68 | 91.6 | 4.95 |
| Average | 4.37 | 54.26 | 11.2 | 4.64 | 62.7 | 10.1 | 4.59 | 101.0 | 4.97 |

Samples 1 to 5 in table 4 above represent five different samples cut out of a single block of cured material resulting from the mixture of example E5. The data demonstrates that there is no significant reduction of mechanical properties after aging.

Example cured materials comprising polystyrene (for example, the cured materials resulting from examples E2, E3 and E5 to E7) have demonstrated excellent properties on the various measures discussed above. For example, tear strength of such cured materials is better than cured materials resulting from examples E1 and E4, which comprise polypropylene). Without being bound by theory, polystyrene may chemically react with the norbornene monomer, to form a copolymer, which has improved properties over the corresponding norbornene homopolymer which would result from polymerization of just norbornene monomers.

There is thus described a mixture curable in the presence of a metallic catalyst to provide a material for thermally insulating a substrate useable subsea, a method of providing the material, a material for thermally insulating a substrate useable subsea, a thermally insulated substrate useable subsea, and a method of providing the thermally insulated substrate with a number of advantages as detailed above.

Furthermore, mixtures, thermally insulating materials and thermally insulated substrates according to the disclosure have a reduced cost compared to known materials such as comparative examples C1 and C2. Furthermore, cured materials according to examples of the disclosure have increased tensile strength toughness. The addition of a water insoluble polymer filler such as polypropylene or polystyrene also limits or prevents shrinkage of the subsequently cured material. Furthermore, the addition of a water insoluble polymer filler such as polypropylene or polystyrene may improve binding to like materials, for example, a cured material comprising a polystyrene filler may bind better to polystyrene substrates.

Norbornene polymers also demonstrate excellent adhesion to polypropylene substrates.

Materials according to the disclosure are impermeable to the ingress of sea water, resistant both to the range of absolute temperatures experienced and the temperature differential across the material, while being sufficiently resilient to resist the flexural and impact stresses pertinent to installation, transport and service.

Although embodiments of the present invention have been described in the preceding paragraphs with reference to various examples, it should be appreciated that modifications to the examples given can be made without departing from the scope of the invention as claimed. For instance, the proportions of the respective components can be varied to provide a required curing time and speed for different applications, and also to modify the mixture's viscosity.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that features described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A thermal insulating material mixture curable in the presence of a metallic catalyst for thermally insulating a subsea substrate, wherein the mixture consists essentially of:
   5-octyl-2-norbornene;
   tricyclopentadiene; and
   a water insoluble polymer filler, wherein the water insoluble polymer filler comprises polystyrene or polypropylene, or derivatives thereof.

2. A mixture according to claim 1, wherein the metallic catalyst is a ruthenium-based catalyst, wherein the ruthenium-based catalyst is a Grubbs catalyst.

3. A mixture according to claim 1, wherein the water insoluble polymer filler is micronized.

4. A mixture according to claim 1, wherein the water insoluble polymer filler is a particulate filler.

5. A mixture according to claim 1, wherein the water insoluble polymer filler comprises micronized polystyrene.

6. A mixture according to claim 1, wherein the water insoluble polymer filler comprises micronized polypropylene.

7. A mixture according to claim 1, wherein a combination of the 5-octyl-2-norbornene and the tricyclopentadiene is from 60 to 99% by weight of the mixture.

8. A mixture according to claim 1, wherein the mixture comprises from 1 to 50% by weight of the water insoluble polymer filler.

9. A mixture according to claim 1, wherein the mixture comprises from 15 to 45% by weight of the water insoluble polymer filler.

10. A mixture according to claim 1, wherein the mixture comprises from 20 to 40% by weight of the water insoluble polymer filler.

11. A mixture according to claim 1, wherein the mixture comprises from 25 to 30% by weight of the water insoluble polymer filler.

12. A material for thermally insulating a substrate useable subsea, wherein the material is the cured reaction product of a mixture consisting essentially of:
   5-octyl-2-norbornene;
   tricyclopentadiene; and
   a water insoluble polymer filler, wherein the water insoluble polymer filler comprises polystyrene or polypropylene, or derivatives thereof.

13. A method, wherein the method comprises:
   forming a mixture consisting essentially of: 5-octyl-2-norbornene, tricyclopentadiene and a water insoluble polymer filler by mixing the 5-octyl-2-norbornene, tricyclopentadiene, and water insoluble polymer filler, wherein the water insoluble polymer filler comprises polystyrene or polypropylene, or derivatives thereof;
allowing the mixture to cure in the presence of a metallic catalyst to provide a material for thermally insulating a substrate useable subsea.

\* \* \* \* \*